Patented Oct. 14, 1947

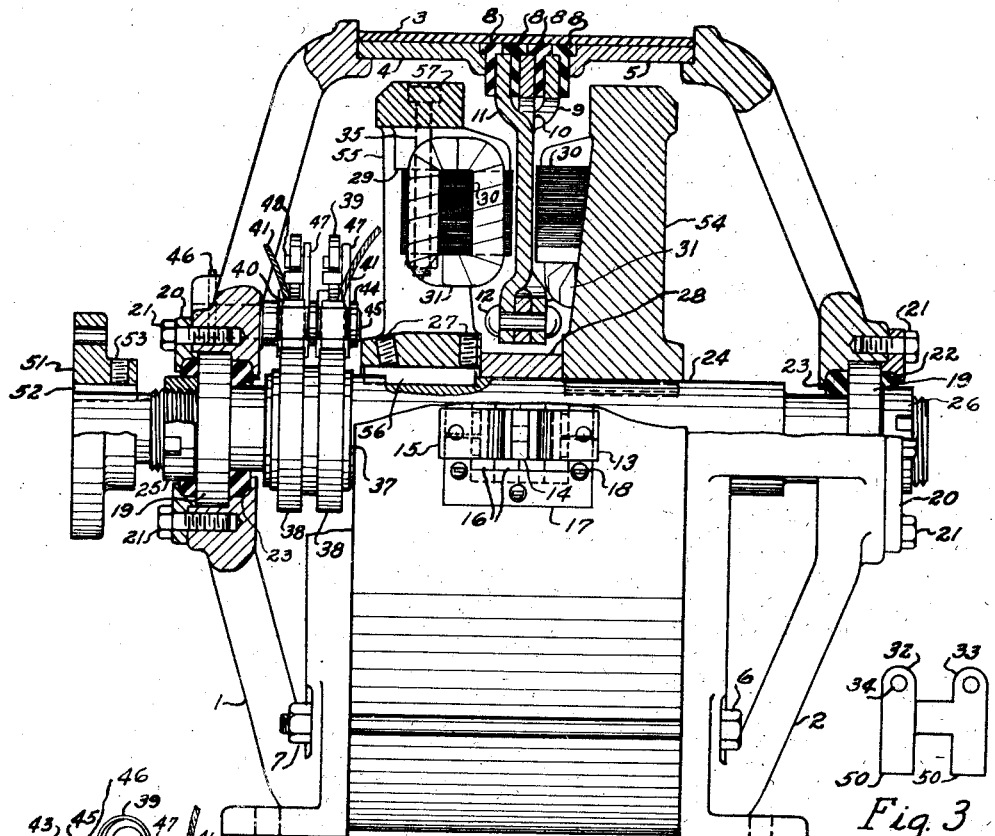

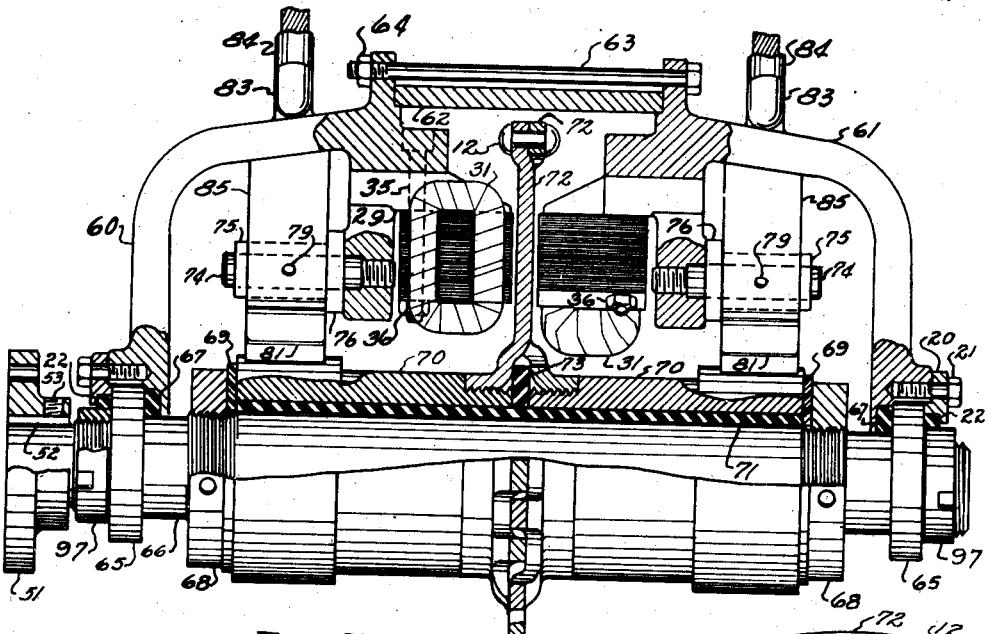
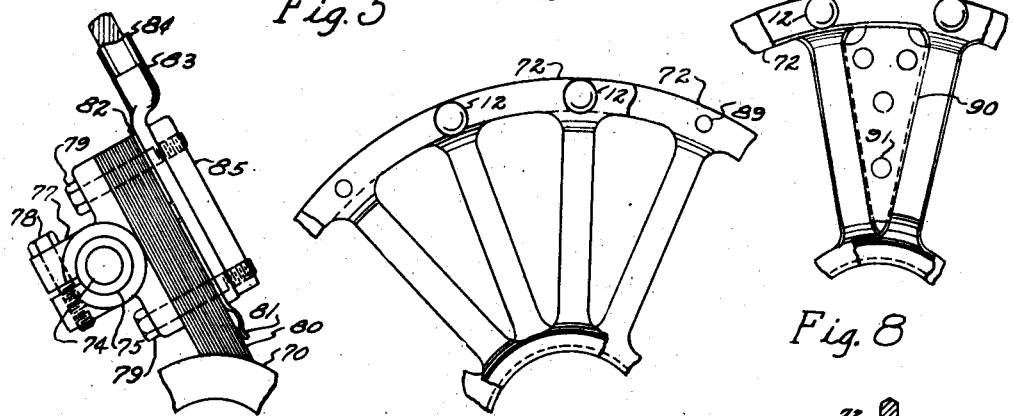
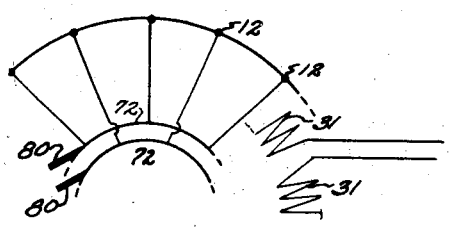
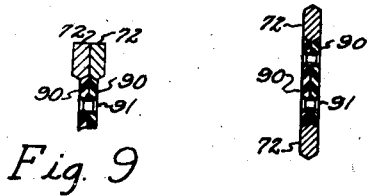

2,428,781

UNITED STATES PATENT OFFICE 2,428,781

ELECTRIC GENERATOR

Claude A. Bowlus, Detroit, Mich.

Application May 4, 1944, Serial No. 534,101

6 Claims. (Cl. 171—252)

1

This invention relates to electric generators and presents a novel machine of favorable manufacturing cost for the production of alternating current at comparatively high frequencies and low voltage, particularly applicable to the operation of resistance welding machines and other devices of large current capacity at higher than commercial frequencies. The construction of the device is especially applicable to resistance welding machines in that same constitutes a compact unit that may readily be incorporated in the body of the welding machine and be driven by a motor operating from lines of commercial frequency and phase, also avoiding objectionable surges on single phases such as may be normally experienced in the case of machines in general use. More particularly the device has special advantages in basic design which are especially favorable to modern manufacture. Other objects and advantages of my invention will become more fully apparent in the following description in which reference will be had to the accompanying drawings wherein:

Fig. 1 is an elevation partly in fragmentary view showing a construction with a rotating field and a stationary armature.

Fig. 2 is a fragmentary view showing the radial disposition of the field and armature parts.

Fig. 3 is an outline drawing of a mating pair of the laminations of a core member of the magnetic field.

Fig. 4 is an electrical diagram of a three phase generator similar to that shown in Fig. 1.

Fig. 5 is a fragmentary view showing an optional construction of a single phase generator.

Fig. 6 shows a detail of the construction of a current collector shown in Fig. 5.

Fig. 7 is a fragmentary view of the rotatable spoked armature member showing in assembly in Fig. 5.

Fig. 8 shows an optional construction of a rotatable spoked armature member similar to that shown in Fig. 7.

Fig. 9 is a sectional view of Fig. 8.

Fig. 10 is a sectional view of Fig. 8.

Fig. 11 is an electrical diagram of the construction shown in Fig. 5.

Referring to the drawings in which a preferred construction for a three phase generator is shown in Fig. 1 and Fig. 2 opposed base members 1 and 2 have annular machine tenons adapted to fit the annular clamp rings 4 and 5 respectively which are fitted on the inner diameter of the annular housing member 3 and retained in said relation by a plurality of clamp, or stay bolts 6, each provided with a nut 7. The annular clamp rings 4 and 5 each have also annular machined tenons adapted to clamp the outer mating insulating ring 8 which in turn clamps the two inner annular insulating rings 8 and 8 and in the intervals between the said insulating rings the stationary spoked conducting armature members 9, 10 and 11, which are electrically and mechanically held in joined relation by a plurality of rivets 12 and which are further provided with terminals respectively 13, 14 and 15, each adapted with bolt holes to accommodate power line terminals and which are further separated by a plurality of insulating members 16 held in relation by retaining members 17 and a plurality of screws 18 threaded into the annular member 3 and disposed about the aperture provided for the clearance of said terminals 13, 14 and 15.

It is to be noted that the spoked members 9, 10 and 11 are electrically connected at the hubs by means of the rivets 12 and insulated at the rims and have the respective terminals 13, 14 and 15 so positioned and are so formed that all spokes lie approximately between the same planes throughout the greater portion of their length, as may be seen in Fig. 1, and also that the angle subtended between adjacent spokes of the said spoked members in assembled relation is practically constant; and further that each of members 9, 10 and 11 have the same number of spokes, as may be seen in Fig. 2. Further it should be noted that the number of spokes of each member 9, 10 and 11 is equal to, or a multiple of the number of magnetic poles of like polarity mounted in one base member of the machine.

The opposed base members 1 and 2 are further provided with inwardly projecting arms which support bosses with axes concentric with the tenons fitting to the annular clamp rings 4 and 5. Said bosses are bored to form seats for the ball bearing assemblies 19 and 19 respectively which are each held in relation to its seat by clamping plate 20 which is in turn held in place with a plurality of screws 21 threaded into the corresponding boss, and are also provided with oil seal members 22 and 23. Fitted into the said bearing assemblies 19 and 19 is the rotatable mounting and driving shaft 24 provided with the rotatable driving collar 51 fitted to same with the driving key 52 and the clamping screw 53. Said shaft 24 is positioned adjustably in an axial direction by means of the threaded thrust collars 25 and 26 fitted to corresponding threaded diameters of said shaft 24 and bearing against the inner races of the respective ball bearing assembly 19.

Positioned on shaft 24 on opposite sides of the spoked members 9, 10 and 11 and separated by the annular spacing member 28 are two similar rotatable magnet mounting members 54 and 55, each fitted closely to said shaft 24 and driven by a key 56 and retained in predetermined longitudinal position on said shaft 24 by means of a plurality of screws 27 bearing on key 56. As indicated by the respective angular position of the two keys 56 and 56, Fig. 2, the magnet mounting members are rotated with respect to one another so that each electromagnet core 30 positioned on one mounting member has its two magnetic poles adjacent the unlike poles of the two nearest electromagnets on the other mounting member to provide a linked additive series of magneto-motive-forces back-and-forth between adjacent core members 30 of the opposed magnet mounting members.

Each magnet mounting member 54 and 55, Fig. 1 and Fig. 2, has a hub, spokes and a rim and is further provided with surfaces 29 machined normal to a radius from the axis thereof on pads projecting inwardly from the rim thereof to which are fitted the laminated cores 30 of a plurality of electro-magnet assemblies the laminations of which are shown in outline in Fig. 3. Said magnet cores 30 are preferably assembled to coils previously form wound and taped, from lamination members 32 and 33, Fig. 3, alternately assembled to right or left side of the core 30 so that the holes 34 register in correct relation in assembly to admit the bolts 35 extending inwardly from the rim 57 and be tightly held in place by the nuts 36.

The shaft 24, Fig. 1 and Fig. 2, is fitted to a diameter thereof with an annular insulating collar 37 which has annular seats turned thereon to tightly mount two slip rings 38 insulated one from another and spaced apart by an enlarged diameter of collar 37. Said slip rings 38 are adapted to rotate with the shaft 24 and have smoothly machined outer annular surfaces which are maintained in electrical contact respectively each with a contacting brush 40 mounted in a brushholder 42 and maintained in yieldable engagement with the slip ring by means of a spiral spring 39 anchored in a slotted mounting boss 48 cast as an integral part of the arm 47 extending from brushholder 42. The said brushholders 42 and 42 are separated enough to avoid electrical contact one to another and each clamped by means of screw 43 non-rotatably over insulating bushing 44 mounted on the stud 45, which is in turn mounted and retained by pin 46 in a hole in boss 49 projecting from the central bearing boss of base member 1. Contacting brush 40 is provided with a connecting conductor 41 of prior art.

In Fig. 3 is shown the outline of lamination members 32 and 33. These parts are assembled with the successive pairs having the joints at opposite sides of the coil 30, Fig. 1, Fig. 2 and Fig. 5, and fixed in relation by welding or means known to prior art.

Referring to the electrical diagram in Fig. 4, it will be noted that the coils 31 of the magnetic field are connected between the slip rings 38 and 38 which are connected to a source of electric current by means of brushes 40 and 40, and as previously explained, the power output is delivered from the terminals 13, 14, and 15. Normally the field magnets are all connected with uniform polarity so that a continuous magnetic circuit interrupted only by the gaps between opposed poles is realized. Rotation of the magnetic field causes electrical potential to be developed in the spokes of each spoked member 9, 10 and 11 in the phase relations indicated.

Referring again to Fig. 1 and Fig. 2, it is evident from known electrical fundamentals that if a spoked conductor were left out of the assembly and the spokes of member 9 were to bisect the intervals between the spokes of member 11, and also if members 9 and 11 were connected electrically at the hubs, single phase current could be generated without other extensive modification of the machine.

Fig. 5 shows a desirable construction in which the magnetic field members are non-rotating while the armature members are normally rotatable and may deliver current through current collectors. Similar base members 60 and 61 have annular machined tenons adapted to fit annular housing member 62 and be clamped tightly thereto by means of a plurality of clamp bolts 63 and nuts 64. Said base members 60 and 61 have each a plurality of inwardly projecting arms which are cast integrally with central bosses which are bored concentrically with the machine tenons to provide seats for a ball bearing assembly 65 and recesses for an inner oil retainer 67. Each bearing assembly is clamped in place by a plate 20 provided with an outer oil retainer 22 and is held in place by a plurality of screws 21, threaded into the respective base members 60 and 61.

Mounted in said bearings 65 and 65 is a rotatable shaft 66 provided with a driving collar 51, driving key 52 and clamping screw 53 threaded into the hub of driving collar 51 against the said key 52. Said shaft 66 is provided at its ends with a pair of threaded portions to which are fitted threaded collars 97 which bear against the inner races of the ball bearing assemblies 65 and by means of which said bearing assemblies may be preloaded, or shaft 66 adjusted in longitudinal position. Shaft 66 is also provided with a second pair of threaded portions inwardly disposed with respect to the bearing assemblies 65 and 65 to each of which is fitted the threaded thrust collar 68 which bears against the insulating washer 69 and the latter in turn against the end of the annular sleeve 70 fitted over the central diameter of shaft 66 and insulated therefrom by the annular insulating sleeve 71. Each sleeve 70 has the inner end threaded into the hub of one of the two mating opposed spoked conducting members 72 which are assembled in pairs with the rims electrically and mechanically connected by the plurality of rivets 12 and with the hubs electrically insulated by means of the annular insulating member 73 which also insulates one sleeve 70 from the other. The spoked members 72, the sleeves 70, the insulating member 73, insulating washers 69, the insulating sleeve 71, the thrust collars 68, and the shaft 66 are locked together in frictional engagement as a rotatable unit that may be driven by driving coupling 51. Other means of driving the conducting sleeves 70 and spoked members 72 may be readily devised from prior art without affecting the electrical characteristics of the device.

The base castings 60 and 61, Fig. 5, each are provided with surfaces 29 machined normal to a radius from the bearing axis to which are fitted electro-magnet assemblies which may be identical with those shown in Fig. 1 and Fig. 2, namely consisting of core 30, coil 31, and held in assembled relation to base casting 60 or 61 by means of the bolts 35 and nuts 36. The poles of the electro-magnets assembled to casting 60 are in assembly spaced from poles of opposite or unlike polarity mounted on casting 61 and separated therefrom by the interval which provides clearance and a reasonable gap in which the spoked members 72 can be rotated.

The base castings 60 and 61 are each provided with an inwardly projecting arm, or boss, into which is threaded a stud 74 on which is mounted an insulating washer 76 and an insulating bushing 75 on which is rigidly clamped a bracket 77, Fig. 6, by means of screw 78. To each bracket 77 is clamped by means of the two screws 79 in turn a laminated collector brush 80, a yieldable spring bearing member 81, a spacer 82, an electrical conductor terminal 83 for the electrical cable 84, and the bearing plate 85. Said laminated collector brush 80 in both cases is held stationary by the respective base casting 60 or 61 on which it is indirectly mounted but bears at the end on the smoothly machined enlarged diameter of the rotatable sleeve 70 which conducts current generated in the spokes of the respective spoked members 72.

More detail of the spoked member 72 is shown in Fig. 7. The plurality of holes 89 are so positioned in each member 72 so that in opposed relation to the mating member 72 the spokes of one bisect the interval of the other. The number of spokes corresponds to the number of poles of like polarity mounted in each base assembly 60 and 61. From the construction shown it is evident also that a three phase armature could be devised with another spoked member, a modified arrangement of insulating members, another insulated sleeve similar in principle to 70, and a third insulated collector brush.

An alternate construction of the spoked member 72 is shown in Fig. 8, in which the spokes are coined, or formed, with doubly sloping sides to which are fitted in assembled relation of two such members 72 by means of a multiplicity of rivets 91 a pair of opposed insulating members 90 as shown in section in Fig. 10 and with beveled edges projecting under the inner edges of the rims of the mating members 72, as shown in Fig. 9. A particular advantage of this arrangement arises from the fact that the rivets 91 may be made of magnetic material of a specifically chosen number and reluctance so that the magnetic permeability between spokes in assembly may lend the desired electrical efficiency.

An electrical diagram, Fig. 11, shows the connections in which the field coils 31, Fig. 5, are excited from a separate source of electric current while the current developed in the spokes of spoked members 72 is delivered from the collector brushes 80.

It is not my intention to confine the scope of this invention to the construction herein shown as preferred, because I am aware that single phase, or multiphase, machines can be readily devised with either stationary field and rotatable armature, or with rotatable field and a stationary armature; also that changes in size and choice of materials under the exigencies of wartime conditions may be required without departing from the spirit and intent of the invention herein described and without limiting same to other than the appended claims.

What I claim is:

1. An alternating current electric generator comprising, a plurality of magneto-motive force elements each having two poles of unlike magnetic polarity in side exposed spaced apart relations, means mounting said magneto-motive force elements circumferentially spaced apart in two side-by-side circles with the poles of either set turned toward the unlike poles of the other set so as to form a continuous series of additive magneto-motive forces for passing magnetic flux back and forth across circumferentially spaced air gaps extending between the two sets, a plurality of electrically conductive members having self supporting rigidity, said members being disposed radially in a plane between said two circular sets for relative movement through said air gaps, conductive means rigidly joining adjacent ends of said members, a plurality of separately insulated conductors joining the other ends of said members in selected groups, and base means supporting said two sets of magneto-motive-force elements in cooperative relatively rotatable relation to said conductive members so that the latter may by relative rotation be caused to move through the air gaps between the former.

2. In combination in an alternating current electric generator, a plurality of magneto-motive force elements each having two poles of unlike magnetic polarity projecting from one side in an exposed spaced apart relation, means mounting said magneto-motive force elements circumferentially spaced apart in two side-by-side circles with the poles of either set turned toward the unlike poles of the other set to form a continuous linked series of magneto-motive forces in additive relation for passing magnetic flux back and forth across circumferentially spaced air gaps extending between the two sets, a plurality of electrically conductive members corresponding in number or being a multiple of the like poles in one of said sets, said members being disposed radially in a plane between said two circular sets and having self supporting rigidity for relative movement through said air gaps, means rigidly joining adjacent ends of said members, a plurality of annular separately insulated conductive means rigidly joining and supporting the other ends of said members in groups selected in accordance with the number of poles and members, and base means supporting said two sets of magneto-motive-force elements and the radially disposed conductive members in cooperative relatively rotatable relation so that the latter may by relative rotation be caused to move through the air gaps between the former.

3. An alternating current electric generator having in combination, a plurality of electromagnets each having two poles of unlike magnetic polarity in a side exposed spaced apart relations, means mounting said electromagnets circumferentially spaced apart in two side-by-side circles with the poles of either set turned toward the unlike poles of the other set to form a continuous linked series of magneto-motive forces for passing magnetic flux back and forth across circumferentially spaced air gaps extending between the two circular sets, a plurality of electrically conductive members disposed radially in a plane between said two circular sets for relative movement through said air gaps, means rigidly joining ends of said members, a plurality of annular separately insulated conductive means rigidly joining and supporting the other ends of said members in selected groups, and base means supporting said two sets of electromagnets and the radially disposed conductive members in relatively rotatable relation so that the latter may by relative rotation be caused to move through the air gaps between the former.

4. In an alternating current electric generator, a shaft, a base structure rotatively supporting said shaft, a plurality of electromagnets each having two spaced apart side exposed poles, means supporting said electro-magnets on said shaft in two side-by-side circular sets, said electro-magnets being so positioned and circumferentially spaced that the poles of either set are opposite to and spaced from unlike poles of the other set to pass electro-magnetic flux back-and-forth across air gaps between the two sets, a plurality of electrical conductive members having self supporting structural rigidity, means supporting said members stationarily from said base structure and extending inwardly in suitable radial positions for passing through the gaps between the electro-magnets of the two sets as these are rotated with the shaft, means firmly joining the inner ends of said members in conductive connection, a plurality of separately insulated annular conductive members joining and supporting the outer ends of selected ones of the members in collected groups, slip rings on said shaft, and conductive means connecting said electro-magnets for energization from said slip rings.

5. In an alternating current electric generator, a shaft, a base structure rotatively supporting said shaft, a plurality of electromagnets each having two spaced apart side exposed poles, two spoked members secured in axially spaced relation on said shaft for supporting said electro-magnets in two side-by-side circular sets, said electro-magnets being positioned and circumferentially spaced on said spoked members so that the poles of either set are opposite to and spaced from unlike poles of the other set to pass electro-magnetic flux back-and-forth across air gaps between the two sets, a plurality of electrical conductive spoked members each having a rim and inwardly extending members of self-supporting structural rigidity, means supporting said members on said base separately insulated and suitably positioned for passing through the gaps between the electro-magnets of the two sets as these are rotated with the shaft, means conductively joining the inner ends of said members, a plurality of annular conductive members joining the outer ends of certain ones of the members in selected groups, slip rings on said shaft, and conductive means connecting said electro-magnets for energization from said slip rings.

6. In combination in an alternative current electric generator, field means forming a circumferentially spaced series of air gaps and magneto-motive-force means for pairing magnetic flux across the gaps in selected phase groups, an axially disposed rotative shaft, two spoked conducting members having their hubs mounted and separately insulated on said shaft so that as the shaft rotates the spoked members pass through said gaps, and, a circular rim conductively connecting the outer ends of said spoked members.

CLAUDE A. BOWLUS.

REFERENCES CITED

The following references are of record in the file of this patent:

UNITED STATES PATENTS

| Number | Name | Date |
|---|---|---|
| 294,043 | Hochhausen | Feb. 26, 1884 |
| 263,150 | Edison | Aug. 22, 1882 |
| 570,914 | Dorman | Nov. 10, 1896 |
| 613,209 | Leblanc | Oct. 25, 1898 |